(12) United States Patent
Busch et al.

(10) Patent No.: US 6,242,554 B1
(45) Date of Patent: Jun. 5, 2001

(54) POLYSILOXANES HAVING POLYETHER QUAT FUNCTIONS

(75) Inventors: Stephan Busch; Manfred Krakenberg, both of Essen; Peter Lersch, Oberhausen; Stephan Stadtmüller, Essen, all of (DE)

(73) Assignee: TH. Goldschmidt AG, Essen (DE)

( * ) Notice: Subject to any disclaimer, the term of this patent is extended or adjusted under 35 U.S.C. 154(b) by 0 days.

(21) Appl. No.: 09/439,409

(22) Filed: Nov. 11, 1999

(30) Foreign Application Priority Data

Nov. 14, 1998 (DE) .............................. 198 52 621
Sep. 1, 1999 (DE) .............................. 199 41 585

(51) Int. Cl.$^7$ .................................. C08G 77/26
(52) U.S. Cl. .................. 528/28; 528/29; 528/38; 556/423; 556/425; 428/365; 428/391; 8/DIG. 1; 8/115.6; 8/115.64; 8/94.1 R; 8/128.3
(58) Field of Search .................. 528/28, 29, 38; 428/365, 391; 556/423, 425; 8/DIG. 1, 94.1 R, 115.6, 128.3, 115.64

(56) References Cited

U.S. PATENT DOCUMENTS

| 5,098,979 | 3/1992 | O'Lenick, Jr. ................ 528/15 |
| 5,807,956 | 9/1998 | Czech ......................... 528/28 |
| 5,811,482 | 9/1998 | Sabia ......................... 524/366 |

FOREIGN PATENT DOCUMENTS

| 37 19 086 | 10/1988 | (DE) . |
| 2 201 433 | * 9/1988 | (GB) . |

* cited by examiner

Primary Examiner—Margaret G. Moore
(74) Attorney, Agent, or Firm—Frommer Lawrence & Haug LLP

(57) ABSTRACT

The invention relates to novel polyether-quaternary organosiloxanyl derivatives, to the preparation of these compounds and to their use in formulations for improving the surface properties of fabrics and fibers.

20 Claims, No Drawings

POLYSILOXANES HAVING POLYETHER QUAT FUNCTIONS

RELATED APPLICATIONS

This application claims priority to German application Nos. 198 52 621.0, filed Nov. 14, 1998, and 199 41 585.4, filed Sep. 1, 1999, herein incorporated by reference.

BACKGROUND OF THE INVENTION

1. Field of the Invention

The invention relates to novel polyether-quaternary organosiloxanyl derivatives, to the preparation of these compounds and to their use in formulations for improving the surface properties of fabrics and fibers.

2. Description of the Related Art

DE 37 19 086 C1 describes quat groups but no polyether fractions. Consequently, the hydrophilicity of the compounds is low.

U.S. Pat. No. 5,098,979 and U.S. Pat. No. 5,807,956 describe siloxane polyether quat compounds in which the quaternary ammonium units are attached directly to the polyether.

Polyoxyalkylene-modified silicone copolymers bring about good soft hand and hydrophilicity (U.S. Pat. No. 5,811,482) on hydrophobic nonwoven surfaces (PE, PP; PE, glass, rayon cellulose, viscose). Applications mentioned include diapers; insoles; paper/fabric cloths for improving the absorbency in conjunction with a pleasant hand. However, no quat groups are present in this case.

SUMMARY OF THE INVENTION

The invention embraces, in a first embodiment, polysiloxanes having polyether quat functions, of the general formula I $$\text{(I)}$$

$$R^2-\underset{R^1}{\overset{R^1}{Si}}-\left[O\underset{R^1}{\overset{R^1}{Si}}\right]_a-\left[\underset{\underset{R^1-Si-R^1}{\overset{O}{|}}}{\overset{R^1}{|}}OSi-\underset{\underset{R^1-Si-R^2}{\overset{O}{|}}}{\overset{O}{|}}\right]_b-\left[O\underset{R^2}{\overset{R^1}{Si}}\right]_c-O\underset{R^1}{\overset{R^1}{Si}}-R^2$$

where
  a=from 5 to 500,
  b=from 0 to 50,
  c=from 0 to 20,
  $R^1$=identical or different aliphatic or aromatic carbon radicals, preferably having of 1 to 8 carbon atoms,
  $R^2$=$R^{2A}$ or $R^{2B}$, with the proviso that there is at least one radical $R^{2A}$ and $R^{2B}$ on the siloxane framework,
  $R^{2A}$=a polyether radical of the formula II $$-(Y)[O(C_2H_{4-d}R^3{}_dO)_e(C_fH_{2f}O)_gX]_n \quad \text{(II)}$$

where
  Y=an (n+1)-valent, optionally branched hydrocarbon radical,
  d=from 1 to 3,
  e=from 1 to 20,
  f=from 2 to 4,
  g=from 1 to 20,
  X=hydrogen, or a monovalent hydrocarbon radical or an acyl radical, each preferably having 1 to 10 carbon atoms,
  n=from 1 to 4,
  the radicals $R^2$ being identical or different in each case,
  $R^{2B}$=a group -M–Z
  where Z is selected from the group consisting of $$-\underset{R^6}{\overset{R^4}{\underset{|}{N^+}}}-R^5 \; A^- \quad -\underset{R^6}{\overset{R^4}{\underset{|}{N^+}}}-(CH_2)_e-R^7-\overset{O}{\overset{\|}{C}}-R^4 \; A^-$$

$$-\underset{R^5}{\overset{R^4}{\underset{|}{N^+}}}-R^8-NR^4R^5 \; A^- \quad -\underset{R^6}{\overset{R^4}{\underset{|}{N^+}}}-(CH_2)_e-NR^4R^5 \; A^-$$

$$-\underset{(C_2H_4O)_hH}{\overset{(C_2H_4O)_hH}{\underset{|}{N^+}}}-(CH_2)_eCH_3 \; A^-$$

$R^3$=hydrogen or alkyl, preferably having 1 to 22 carbon atoms, $R^4$, $R^5$, $R^6$ alkyl, preferably having 1 to 22 carbon atoms,
  $R^7$=—O— OR —$NR^9$—,
  $R^8$=a divalent-valent, optionally branched hydrocarbon radical, and
  $R^9$=hydrogen or alkyl, preferably having 1 to 6 carbon atoms,
  A=a counterion to the positive charges on the quaternized nitrogen groups, selected from organic or inorganic anions of physiologically compatible acids HA,
  h=from 1 to 20, preferably from 1 to 6,
  M=a divalent radical selected from the group consisting of $$-(CH_2)_3OCH_2\underset{OH}{\overset{|}{C}H}CH_2-$$

$$-(CH_2)_2-\bigcirc-OH$$

$$-(CH_2)_3OCH_2\underset{CH_2OH}{\overset{|}{C}H}CH_2- \quad -(CH_2)_x-CH_2\underset{OH}{\overset{|}{C}H}CH_2-$$

$$-(CH_2)_2-\bigcirc-OH$$

$$-(CH_2)_xCH_2\underset{|}{C}HCH_2-OH \quad \bigcirc-OH$$

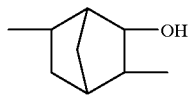

Compared with the siloxane quats of the prior art, the polyether siloxane quats of the invention are more hydrophilic and are compatible in a polar environment. They combine the advantages of the individual segments: polyether, quat, and siloxane.

DESCRIPTION OF THE PREFERRED EMBODIMENTS

For the purposes of the present invention, particular preference is given to siloxanes having polyether quat functions, of the general formula I, in which a=from 5 to 300,
b=from 0 to 20,
c=from 0 to 5, and
a+b+c≧25.

If polyether radicals of the general formula II are at issue in the context of the present invention, then the sequence of the propylene oxide radicals and ethylene oxide radicals preferably represents polyether radicals in blockwise mixture.

In a further preferred embodiment of the present invention, the counterion A to the positive charges on the quaternized nitrogen groups consists of the anion of a physiologically compatible acid HA which with particular preference is selected from acetic acid, L-hydroxy carboxylic acids, and aromatic carboxylic acids.

WORKING EXAMPLES

Example 1

A 1 l three-necked flask equipped with a stirrer, intensive condenser, thermometer and dropping funnel was charged with 0.1 mol of dimethylaminopropylamine and 45 ml of 2-propanol, and 0.1 mol of acetic acid was added at 20° C. The mixture was allowed to react at 25° C. for 30 minutes and then 0.1 mol of the epoxy polyethersiloxane of the formula

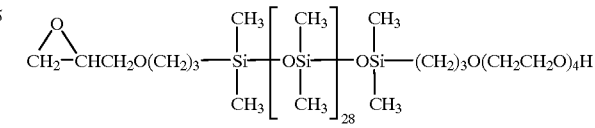

was added dropwise. The reaction mixture was first stirred at 25° C. for 0.5 h and then heated at 90° C. for about 5 h. Subsequently, the solvent was removed by distillation at 90° C. and 0.2 bar. The polyethersiloxane quat was obtained as a colorless to pale yellow, oily product. After cooling to room temperature, the product was filtered. According to the results of $^{29}$Si-NMR and $^{13}$C-NMR spectroscopy, the end product has the following structure:

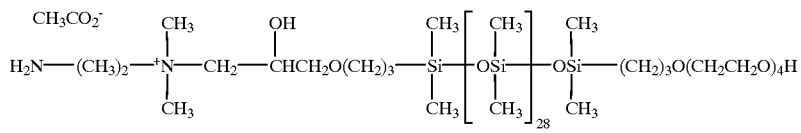

Example 2

A 1 l three-necked flask equipped with a stirrer, intensive condenser, thermometer and dropping funnel was charged with 0.1 mol of dimethylaminopropylamine and 45 ml of 2-propanol, and 0.1 mol of acetic acid was added at 20° C. The mixture was allowed to react at 25° C. for 30 minutes and then 0.1 mol of the epoxy polyethersiloxane of the formula

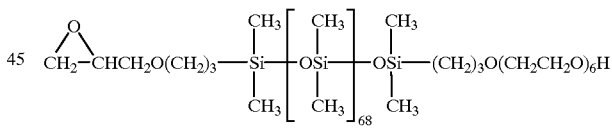

was added dropwise. The reaction mixture was first stirred at 25° C. for 0.5 h and then heated at 90° C. for about 5 h. Subsequently, the solvent was removed by distillation at 90° C. and 0.2 bar. The polyethersiloxane quat was obtained as a colorless to pale yellow, oily product. After cooling to room temperature, the product was filtered. According to the results of $^{29}$Si-NMR and $^{13}$C-NMR spectroscopy, the end product has the following structure:

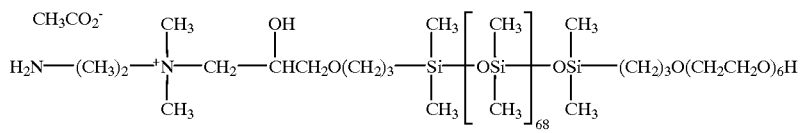

Example 3

A 1 l three-necked flask equipped with a stirrer, intensive condenser, thermometer and dropping funnel was charged with 0.1 mol of 3-N,N-dimethylaminopropyllaurylamide and 45 ml of 2-propanol, and 0.1 mol of acetic acid was added at 20° C. The mixture was allowed to react at 25° C. for 30 minutes and then 0.1 mol of the epoxy polyethersiloxane of the formula

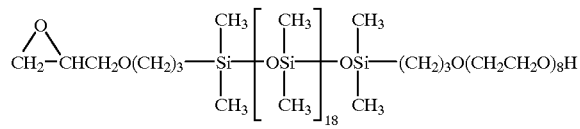

was added dropwise. The reaction was conducted and the product worked up as in Example 1. According to the results of $^{29}$Si-NMR and $^{13}$C-NMR spectroscopy, the end product has the following structure:

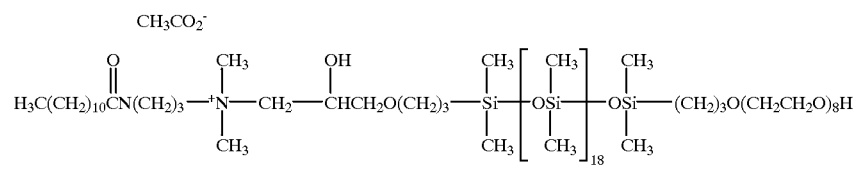

Example 4

A 1 l three-necked flask equipped with a stirrer, intensive condenser, thermometer and dropping funnel was charged with 0.1 mol of dimethylaminopropylamine and 45 ml of 2-propanol, and 0.1 mol of acetic acid was added at 20° C. The mixture was allowed to react at 25° C. for 30 minutes and then 0.1 mol of the epoxy polyethersiloxane of the formula

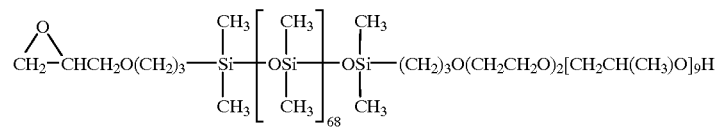

was added dropwise. The reaction was conducted and the product worked up as in Example 1.

According to the results of $^{29}$Si-NMR and $^{13}$C-NMR spectroscopy, the end product has the following structure:

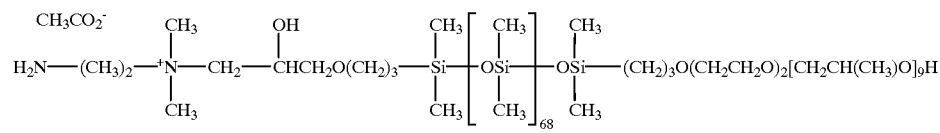

Example 5

A 1 l three-necked flask equipped with a stirrer, intensive condenser, thermometer and dropping funnel was charged with 0.1 mol of tetramethyl-1, 6-hexanediamine and 45 ml of 2-propanol, and 0.1 mol of acetic acid was added at 20° C. The mixture was allowed to react at 25° C. for 30 minutes and then 0.1 mol of the epoxy polyethersiloxane of the formula

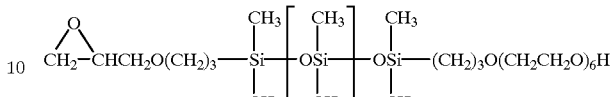

was added dropwise. The reaction was conducted and the product worked up as in Example 1. According to the results of $^{29}$Si-NMR and $^{13}$C-NMR spectroscopy, the end product has the following structure:

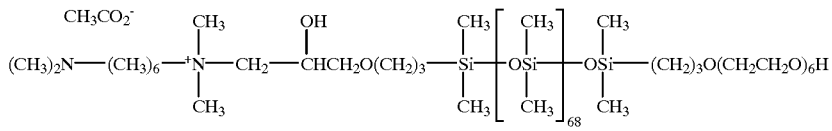

Example 6

A 1 l three-necked flask equipped with a stirrer, intensive condenser, thermometer and dropping funnel was charged with 0.1 mol of poly(10)oxyethyleneoctadecyl-amine and 45 ml of 2-propanol, and 0.1 mol of acetic acid was added at 20° C. The mixture was allowed to react at 25° C. for 30 minutes and then 0.1 mol of the epoxy polyethersiloxane of the formula

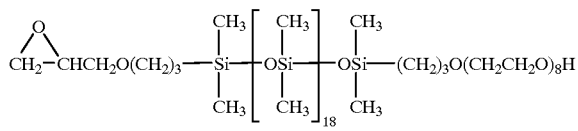

was added dropwise. The reaction was conducted and the product worked up as in Example 1. According to the results of $^{29}$Si-NMR and $^{13}$C-NMR spectroscopy, the end product has the following structure:

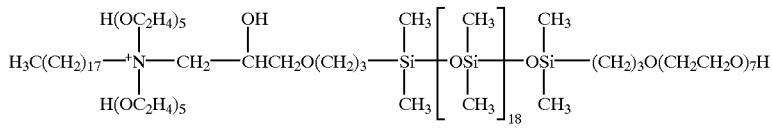

The compounds of the invention possess a good soft hand and low yellowing tendency and permit the permanent finishing of substrates (cotton, polyesters, fleeces, nonwovens, leather).

In order to test the hydrophilicity of the compounds of the invention and of a siloxane functionalized with ammonium groups and of a siloxane functionalized with polyalkoxy groups, one cotton fabric in each case was treated with a 1% strength by weight isopropanolic solution of the active substance and squeezed off on a pad mangle (load: 30 kg). This was followed by fixing at 150° C. for 3 minutes. The result was a very soft, pleasant hand of the textile substrate finished with the compounds of the invention.

The hydrophilicity was tested using the TEGEWA drop test (Melliand Textilberichte 68 (1987) 581 ff. The finished fabric was clamped horizontally on a tensioner without coming into contact with the base. A water droplet of 0.050 ml±10% was dropped onto the fabric from a height of 40 mm. As soon as the droplet hit the material under test, a measurement of the time was begun. The time measurement was stopped when the droplet had penetrated fully into the fabric and the gloss had disappeared or when the droplet took more than 300 seconds to penetrate the material under test. In the latter case, the measurement was terminated and the value ">300 sec" was entered.

| Product | Hydrophilicity values on cotton fabric after application [sec] |
|---|---|
| untreated | 2 |
| 1 | 70 |
| 2 | 90 |
| 3 | 50 |
| 4 | >300 |
| 5 | 140 |
| 6 | 50 |

The above description of the invention is intended to be illustrative and not limiting. Various changes or modifications in the embodiments described may occurred to those skilled in the art. These changes can be made without departing from the sprit or scope of the invention.

What is claimed is:

1. A polysiloxane having polyether quat functions, of the general formula I

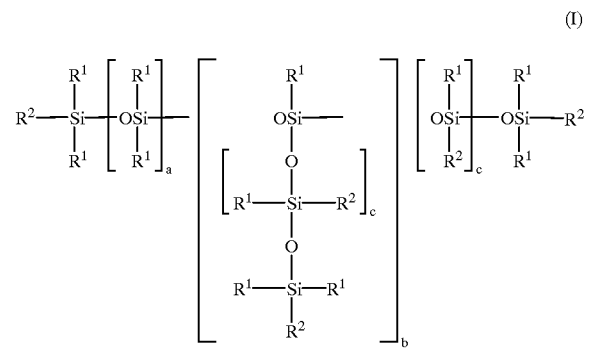

(I)

where
a=from 5 to 500,
b=from 0 to 50,
c=from 0 to 20,
$R^1$=identical or different aliphatic or aromatic carbon radicals,
$R^2$=$R^{2A}$ or $R^{2B}$, with the proviso that there is at least one radical $R^{2A}$ and $R^{2B}$ on the siloxane framework,
$R^{2A}$=a polyether radical of the formula II

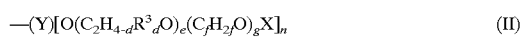

(II)

where

Y=an (n+1)-valent, optionally branched hydrocarbon radical,
d=from 1 to 3
e=from 1 to 20,
f=from 2 to 4,
g=from 1 to 20,
X=hydrogen, or a monovalent hydrocarbon radical or an acyl radical,
n=from 1 to 4
$R^{2B}$=a group -M–Z
where Z is selected from the group consisting of

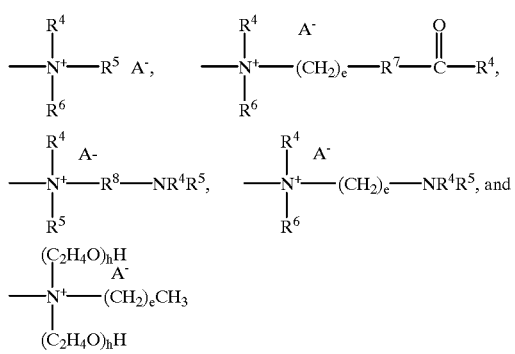

wherein
$R_3$=hydrogen or alkyl,
$R^4$, $R^5$, $R^6$=in each case independently of one another alkyl,
$R^7$=—O— or —$NR^9$—,
$R^8$=divalent, optionally branched hydrocarbon radical, and
$R^9$=hydrogen or alkyl,
A=a counterion to the positive charges on the quaternized nitrogen groups, selected from organic or inorganic anions of physiologically compatible acids HA,
h=from 1 to 20, and e=from 1 to 20,
M=a divalent radical selected from the group consisting of

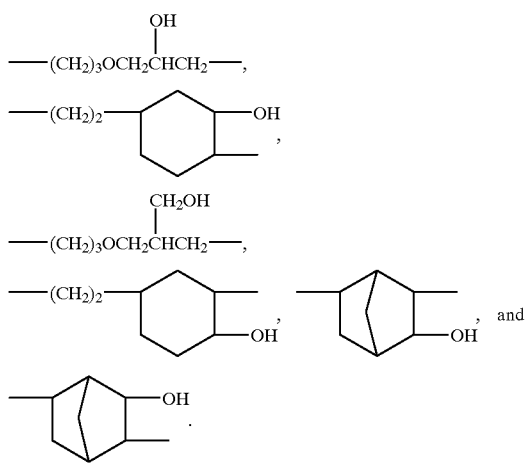

2. A polysiloxane as claimed in claim 1, wherein
a=from 5 to 500,
b=from 0 to 50,
c=from 0 to 20,
$R^1$=identical or different aliphatic or aromatic carbon radicals of 1 to 8 carbon atoms,
$R^2$=$R^{2A}$ or $R^{2B}$, with the proviso that there is at least one radical $R^{2A}$ and $R^{2B}$ on the siloxane framework,
$R^{2A}$=a polyether radical of the formula II

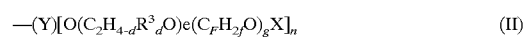    (II)

where

Y=an (n+1)-valent, optionally branched hydrocarbon radical,
d=from 1 to 3,
e=from 1 to 20,
f=from 2 to 4,
g=from 1 to 20,
X=hydrogen, or a monovalent hydrocarbon radical or an acyl radical each of 1 to 10 carbon atoms,
n=from 1 to 4,
$R^{2B}$=a group -M–Z
where Z is selected from the group consisting of

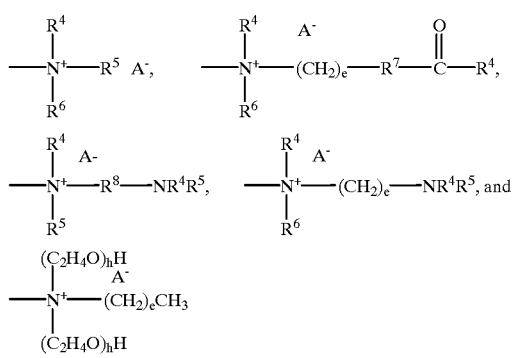

$R^3$=hydrogen or alkyl of 1 to 22 carbon atoms
$R^4$, $R^5$, $R^6$,=in each case independently of one another alkyl of 1 to 22 carbon atoms,
$R^7$=—O— or —$NR^9$—,
$R^8$=divalent, optionally branched hydrocarbon radical, and
$R^9$=hydrogen or alkyl of 1 to 6 carbon atoms,
A=a counterion to the positive charges on the quarternized nitrogen groups, selected for organic or inroganic anions of physiologically compatible acids HA,
M=a divalent radical selected from the group consisting of

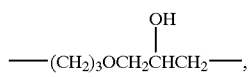

-continued

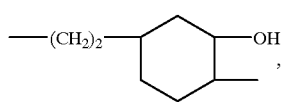

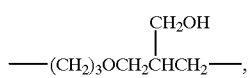

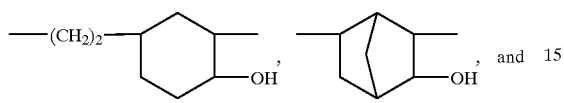

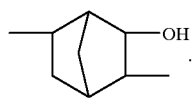

3. A polysiloxane as claimed in claim 1, wherein the polyether radical of general formula II consists of polyethylene oxide and polypropylene oxide block copolymers and wherein the polyether radicals are arranged blockwise.

4. A polysiloxane as claimed in claim 1 wherein Z is

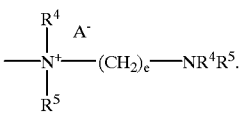

5. A polysiloxane as claimed in claim 1 wherein Z is

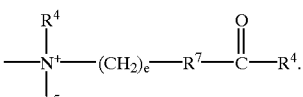

6. A polysiloxane as claimed in claim 1, wherein Z is

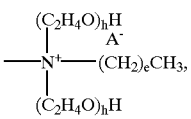

7. A polysiloxane as claimed in claim 1, wherein M is

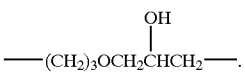

8. A polysiloxane as claimed in claim 1, which is

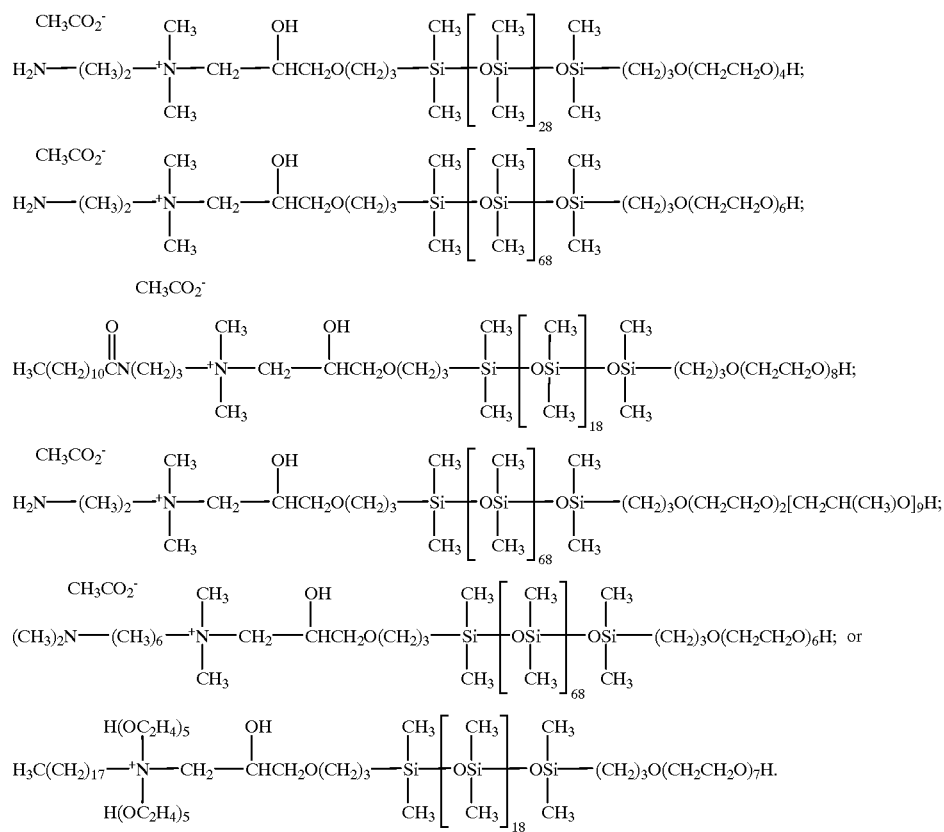

9. A polysiloxane as claimed in claim 1, wherein
a=from 5 to 300,
b=from 0 to 20,
c=from 0 to 5, and
a+b+c≧25.

10. A polysiloxane as claimed in claim 1, wherein the physiologically compatible acid HA is acetic acid, L-hydroxy-carboxylic acids or aromatic carboxylic acids.

11. A substrate comprising on at least one surface thereof a polysiloxane according to claim 1.

12. The substrate according to claim 11, wherein the substrate is cotton, polyesters, fleeces, or leather.

13. The substrate according to claim 11, wherein the substrate is a textile.

14. The substrate according to the claim 11, wherein the substrate is nonwoven.

15. A method of imparting softness and hydrophilicity to a substrate which comprising applying to said substrate a polysiloxane according to claim 1.

16. The method according to claim 15, wherein the substrate is nonwoven.

17. The method according to claim 15, wherein the substrate is a textile or a fiber.

18. The method according to claim 17, wherein the textile is cotton.

19. The method according to claim 15, wherein the substrate is polyester, fleeces or leather.

20. A method for improving the surface properties of a fabric of fiber which comprises applying to said fabric or fiber, a polysiloxane as claimed in claim 1.

* * * * *